United States Patent [19]

Capez

[11] Patent Number: 4,936,672
[45] Date of Patent: Jun. 26, 1990

[54] MULTIFOCAL CONTACT LENS

[76] Inventor: Pierre Capez, 196, Bd Bineau, 92200 Neuilly-Sur-Seine, France

[21] Appl. No.: 216,011

[22] Filed: Jul. 7, 1988

[30] Foreign Application Priority Data

May 27, 1988 [FR] France .................. 88 07112

[51] Int. Cl.$^5$ .................. G02C 7/04
[52] U.S. Cl. .................. 351/161
[58] Field of Search .......... 351/160 R, 160 H, 161, 351/162

[56] References Cited

U.S. PATENT DOCUMENTS

| 3,950,082 | 4/1976 | Volk | 351/161 |
| 4,162,122 | 7/1979 | Cohen | 351/161 |
| 4,199,231 | 4/1980 | Evans | 351/161 |
| 4,525,043 | 6/1985 | Bronstein | 351/161 |
| 4,640,595 | 2/1987 | Volk | 351/161 |

FOREIGN PATENT DOCUMENTS 0184490 11/1985 European Pat. Off. .
0232191 7/1987 European Pat. Off. .
908133 6/1944 France .
1423908 11/1964 France .

Primary Examiner—Scott J. Sugarman
Attorney, Agent, or Firm—Mason, Kolehmainen, Rathburn & Wyss

[57] ABSTRACT

This lens has a spherical ring-shaped zone to correct long sight and an aspherical central zone to correct short sight and mid-distance sight, said central zone having a surface of revolution which is shaped like a dome bulging out of the external side of the lens. The dome is approximately cone-shaped and its surface extends entirely on one and the same side of this cone, outside it. The height of the vertex of the dome ranges, before grinding and in the dry state, between 3 μm and 6 μm, and its base diameter ranges between 1.4 mm. and 1.9 mm. The generatrix of this surface of revolution comprises in succession, from the base to the vertex, a first arc of a curve with an increasing slope, a second arc of a curve with a decreasing slope, a third arc of a curve with a substantially constant slope and a fourth arc of a curve with a generally increasing slope.

19 Claims, 1 Drawing Sheet

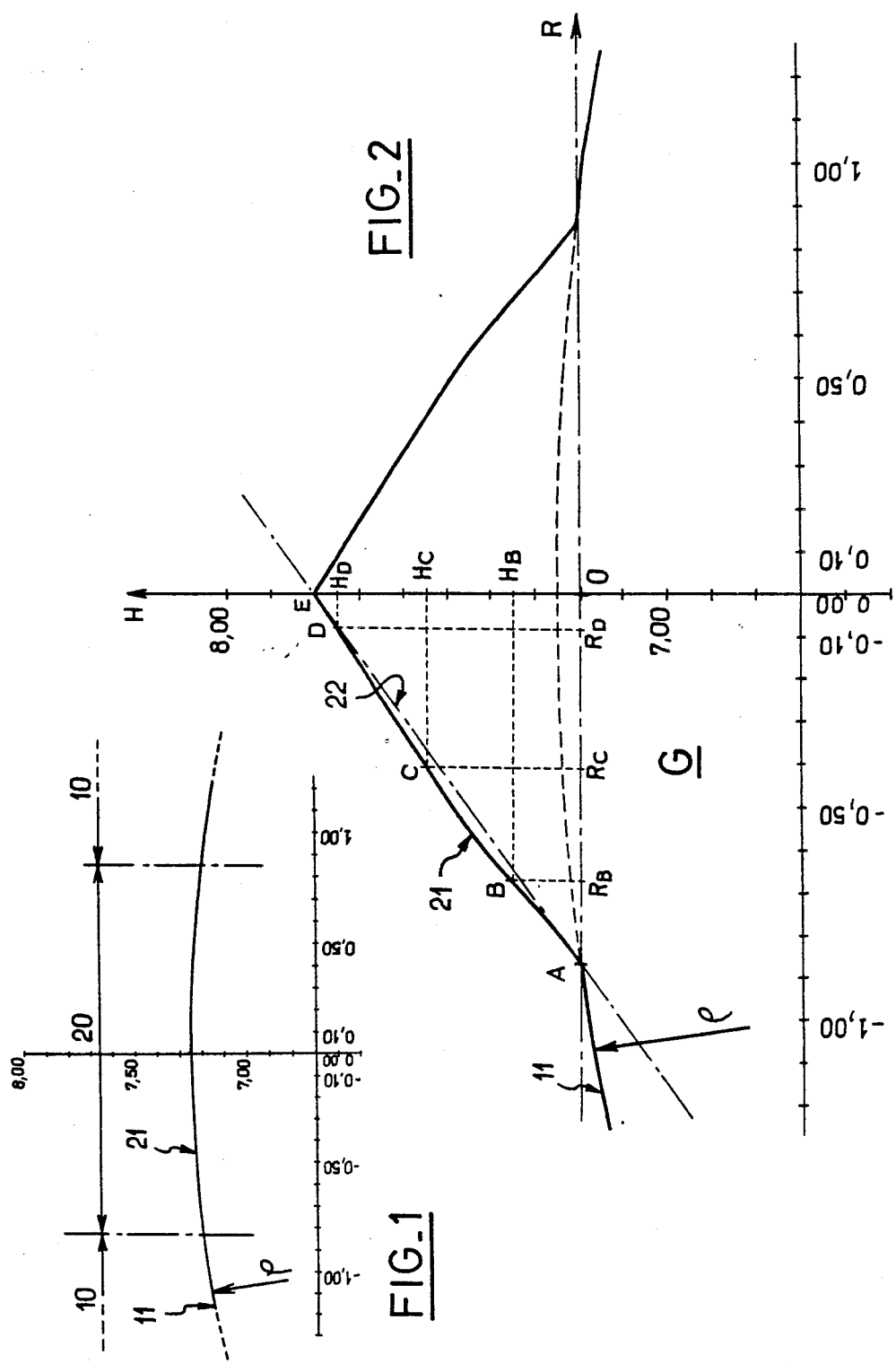

MULTIFOCAL CONTACT LENS

BACKGROUND OF THE INVENTION

1. Field of the Invention

The present invention concerns a multifocal contact lens.

Multifocal contact lenses, which are especially intended for long-sighted persons, are designed so that they simultaneously form several images of one and the same object located in the field of vision. These various images correspond to different dioptric corrections, providing for good eyesight, both long-distance and short-distance eyesight, with the selection between the different images formed on the retina being made spontaneously by the cortex.

(The term "long-distance eyesight" refers herein to eyesight entailing accommodation to infinity or near infinity. The term "short-distance eyesight" refers herein to eyesight entailing maximum, accommodation to the subject or a neighbouring, accommodation (typically for reading) and the term "mid-distance eyesight" refers to eyesight corresponding to any accommodation located between these two extremes).

2. Description of the Prior Art

There are known lenses of this type (see, in particular, EP-A-0 232 191) comprising a spherical ring-shaped zone which provides long-sight correction and an aspherical central zone which provides short-sight and mid-sight correction, this central zone having a dome-shaped surface of revolution bulging out on the outer surface of the lens.

Since it has two zones, a spherical zone and an aspherical zone, a lens of this type exhibits, on the whole, dioptric power which varies from the center towards the periphery. However, it is noted in practice that while lenses of this type give good short-distance eyesight (through the central part of the aspherical central zone) and good long-distance eyesight (through the spherical ring-shaped zone), they are not very satisfactory for mid-distance eyesight. This is because of the transition in dioptric power between short-sight correction and long-sight correction.

Apart from the fact that it does not give the wearer satisfactory mid-distance eyesight, this drawback increases his eye fatigue because of the difficulty experienced by the cortex in selecting a satisfactory image of an object located at mid-distance.

SUMMARY OF THE INVENTION

The present invention is aimed at coping with this difficulty by proposing a multifocal contact lens providing a very gradual transition between long-distance eyesight and short-distance eyesight and, therefore, providing excellent accommodation for mid-distance eyesight.

For this purpose, according to the invention, the central dome of the lens is approximately cone-shaped and its surface extends essentially from one and the same side of this cone to the exterior of the cone.

Very advantageously, the height of the vertex of the dome, before grinding and in the dry state, ranges from 3 to 6 μm (from 3.57 to 7.14 μm in the hydrated state) and the diameter of the base of the dome, before grinding and in the dry state, ranges from 1.4 to 1.9 mm (from 1.66 to 2.26 mm in the hydrated state).

Preferably, with reference to the lefthand part G of FIG. 2, the generatrix of said surface of revolution comprises, from its base to the vertex, a first arc of a curve with an increasing slope; a second arc of a curve with a decreasing slope, a third arc of a curve with a substantially constant slope and a fourth arc of a curve with a substantially increasing slope.

BRIEF DESCRIPTION OF THE DRAWINGS

Other features and advantages of the invention will emerge from the following detailed description of an embodiment of a lens according to the present invention, made with reference to the appended figures, of which:

FIG. 1 shows a partial view of the general shape of the external surface of the multifocal contact lens according to the present invention;

FIG. 2 shows an enlarged view, corresponding to FIG. 1, where the scale of the ordinates has been considerably expanded so as to show the shape of the central dome of the lens.

DESCRIPTION OF A PREFERRED EMBODIMENT

The lens comprises essentially (FIG. 1) a spherical ring-shaped zone 10, giving long-sight correction, and a aspherical central zone 20, giving short-sight correction and mid-sight correction.

The radius $\rho$ of the spherical external surface 11 (FIG. 2) of the ring-shaped zone 10 is chosen as a function of the correction which is sought to be made for long-sight correction. This radius typically having a value ranging from 6.60 to 9.30 mm. for corrections respectively ranging from $+5$ and $-11$ diopters.

The central zone 20 has a surface 21 that bulges out from the spherical surface 11, this surface 21 being a dome-shaped aspherical surface of revolution.

We shall now give a detailed description of the shape of this aspherical surface 21 with reference to FIG. 2 where, for the clarity of the illustration, the scale of the heights H has been considerably increased, i.e. by a coefficient of about 100 times.

Furthermore, all the dimensions shown will always be dimensions obtained after grinding, hence they will be dimensions in the dry state. To obtain the dimensions in the hydrated state, the linear expansion coefficient corresponding to the material used, in the case of flexible lenses, must be applied to the values indicated. For the optical functions of the lens it is, of course, the dimensions of the flexible lens, namely the lens in the hydrated state, that are the determining dimensions.

To make the lens of the invention, it is possible, for example, to use a poly(hydroxyethylmethacrylate) with 38.4% hydrophyly, displaying an isotropic linear expansion coefficient of 1.19.

Finally, it will be noted that the shape of the curve that will be given is the one obtained before grinding. This means that its general shape will be preserved after grinding but that certain transition zones become even more gradual, especially the vertex of the dome as well as its junction with the spherical ring-shaped zone.

The dome-shaped surface of revolution 21, which forms the outer surface of the aspherical central part of the lens, is substantially shaped like a cone 22, but has its surface extending essentially on one and the same side of this cone, essentially to the exterior of this cone.

In other words, the generatrix of the surface 21, (namely the arc AE) will be essentially located on the same side of the generatrix of the cone 22 (namely the segment AE) having the same vertex and the same base circle.

The two main parameters that determine the shape of the dome are, before grinding and in the dry state:

the height OE of the vertex which should range between 3 and 6 μm (5.75 μm in the example of FIG. 2), and the diameter of the base circle (that is twice the radius OA) which should range between 1.4 and 1.9 mm (1.58 mm in the example of FIG. 2)

As for the contour of the generatrix of the dome, it is sub-divided essentially into four distinct parts which can be analyzed as follows, with reference to the left-hand side G of FIG. 2

A first arc of a curve AB actually generates a junction zone between the spherical ring-shaped zone of the lens and the aspherical central portion which has a true mid-sight and short-sight correcting function.

A second arc of a curve BC generates a transition zone which initiates the mid-sight correcting zone.

A third arc of a curve CD, which is in fact essentially rectilinear, generates the mid-sight correcting zone, possibly, the short-sight correcting zone.

Finally, a fourth arc of a curve DE generates the central portion of the dome which is responsible for eyesight correction for short distances to very short distances.

It must be specified here, with reference to the left-hand side G of FIG. 2, that the contour of the generatrix of the dome has a derivate dH/dR with a constantly positive sign, the different single arcs of curves being capable, however, of having increasing, constant or decreasing slopes.

The first arc of a curve AB has an increasing part; the generated zone does not have any natural optical corrective function, but is, however, indispensable to preventing the perception of spurious images.

The coordinates of the point B can be defined by its height $H_B$ and its radial spread $R_B$, with reference to the main characteristics of the dome, i.e., respectively its height OE and its base radius OA, in the following way:

$$0.7 \leq R_B/OA \leq 0.8$$

$$0.2 \leq H_B/OD \leq 0.3$$

The second arc of a curve BC has a decreasing slope. However, in the specific embodiment described with reference to FIG. 2, it touches a maximum, i.e. substantially in the middle of the arc BC, the spread with respect to the generatrix of the cone (segment AE) touches a maximum. This zone is essential to initiate or prepare the subsequent mid-sight correction zone.

The coordinates of the point C may be defined by its height $H_C$ and its radial spread $R_C$ with reference to the main characteristics of the dome, namely its height OE and its base radius OA, as follows:

$$0.55 \leq R_C/OA \leq 0.65$$

$$0.40 \leq H_C/OA \leq 0.50$$

The third curve position CD has a substantially constant slope, i.e. it actually generates a surface which is practically truncated and is responsible for mid-sight correction.

The coordinates of the point D can be defined by its height $H_D$ and its radial spread $R_D$ with reference to the main characteristics of the dome, namely, its height OE and its base radius OA, respectively, as follows:

$$0.15 \leq R_D/OA \leq 0.25$$

$$0.90 \leq H_D/OE \leq 0.95$$

Finally, the last arc of a curve DE, with a substantially increasing slope, creates a substantially conical last surface portion. The exact position of the point D as well as the slope of this arc of a curve may undergo a few variations, essentially depending on the short-sight corrective power desired for the lens. In practice, especially after subsequent grinding, the vertex of the dome may have a slightly rounded appearance without this resulting in any disturbance of short-distance eyesight.

Lenses of this type can be made by machining a disk of material conventionally used to produce contact lenses or, again, by molding. In either case, semi-finished lenses are obtained and generally have to undergo final grinding.

Experiments on contact lenses according to the present invention have shown that, unlike all multifocal lenses proposed until now, they can be used to give perfect long-distance eyesight, short-distance eyesight as well as mid-distance eyesight without the least perception of spurious images.

What is claimed is:

1. A multifocal contact lens comprising a spherical ring-shaped zone to correct long sight and an aspherical central zone to correct short sight and mid-distance sight, said central zone having a surface of revolution which is shaped like a dome bulging out of the external side of the lens wherein the dome is approximately cone-shaped, with its surface extending essentially on one side of the outside of the cone.

2. A lens according to claim 1 wherein the height of the apex of the dome ranges, before grinding and in the dry state, between 3 and 6 μm, that is, between 3.57 and 7.14 μm respectively in the hydrated state.

3. A lens according to either of the claims 1 or 2 wherein the diameter of the base of the dome ranges, before grinding and in the dry state, between 1.4 and 1.9 mm., that is, between 1.66 and 2.26 mm. respectively in the hydrated state.

4. A lens according to either of the claims 1 or 2 wherein the generatrix of the said surface of revolution successively comprises, from the base to the vertex:
   a first arc of a curve with an increasing slope,
   a second arc of a curve with a decreasing slope,
   a third arc of a curve with a substantially constant slope, and,
   a fourth arc of a curve with a generally increasing slope.

5. A lens according to claim 4 wherein the junction point between the first and second arc of a curve is located at a height ranging between 20% and 30% of the height of the dome and at a radial spread ranging between 70% and 80% of the radius of the base of the dome.

6. A lens according to claim 4 wherein the junction point between the second and third arc of the curve is located at a height ranging between 40% and 50% of the height of the dome and at a radial spread ranging between 55% and 65% of the radius of the base of the dome.

7. A lens according to claim 4 wherein the junction point between the third and the fourth arc of a curve is located at a height ranging between 90% and 95% of the height of the dome and at a radial spread ranging between 15% and 25% of the radius of the base of the dome.

8. A lens according to any claim 4 wherein the difference between the surface of revolution constituting the aspherical central part of the lens and the generatrix of the cone touches a maximum in the zone of the second arc of a curve, substantially in the vicinity of the median part of this arc.

9. A lens according to claim 5 wherein the junction point between the second and third arc of the curve is located at a height ranging between 40% and 50% of the height of the dome and at a radial spread ranging between 55% and 65% of the radius of the base of the dome.

10. A lens according to claim 9 wherein the junction point between the third and the fourth arc of a curve is located at a height ranging between 90% and 95% of the height of the dome and at a radial spread ranging between 15% and 25% of the radius of the base of the dome.

11. A multifocal contact lens having an external and an internal side and comprising a spherical ring-shaped zone and an aspherical central dome disposed within said ringshaped zone, said central dome bulging out of the external side of said lens, said central dome having multiple discrete zones and a predetermined vertex and base circle, said central dome being formed to substantially surmont the exterior of a cone having the same vertex and base circle as the central dome.

12. The lens of claim 11 wherein said central dome further includes a junction zone, a mid-sight correcting zone, a short-sight correcting zone, and a transition zone, said junction zone being located between said spherical ring-shaped zone and said transition zone, said transition zone being located between said junction zone and said mid-sight correcting zone, and said mid-sight correcting zone being located between said transition zone and said short-sight correcting zone.

13. The lens of claim 12 wherein each of said zones has a predetermined slope and wherein the slope of the junction zone is increasing, the slope of the transition zone is decreasing, the slope of the mid-site correcting zone is substantially constant, and the slope of the short-sight correcting zone is increasing.

14. A multifocal contact lens comprising a ringshaped spherical zone and an aspheric central dome disposed within said ring shaped spherical zone, wherein at least a portion of said aspheric central dome includes a ring-shaped zone having a constant slope.

15. The lens of claim 14 wherein said central dome further includes a transition zone having an increasing slope located adjacent said ring-shaped spherical zone.

16. The lens of claim 15 wherein said central dome further includes a ring-shaped zone having a decreasing slope located between said transition zone and said constant slope zone.

17. The lens of claim 16 wherein said central dome further includes a central zone having an increasing slope, the slope of said increasing slope central zone being greater than the slope of said transition zone.

18. A multifocal contact lens comprising a ringshaped spherical zone and an aspheric central dome disposed within said ring-shaped spherical zone, wherein said aspheric central dome is formed from a plurality of non-continuous zones.

19. A multifocal contact lens comprising a ringshaped spherical zone and an aspheric central dome disposed within said ring-shaped spherical zone, wherein said aspheric central dome is formed from a generating function that is mathematically discontinuous.

* * * * *